Feb. 9, 1965 W. VÖLKENING 3,168,774
ARRANGEMENT FOR AND METHOD OF FACILITATING THE
HANDLING AND FITTING OF ANTIFRICTION BEARINGS
CAPABLE OF BEING DISMANTLED
Filed Nov. 29, 1961

INVENTOR
Wilhelm Volkening

BY
Stevens, Davis, Miller & Mosher
ATTORNEYS

INVENTOR
Wilhelm Volkening
BY Stevens, Davis, Miller & Mosher
ATTORNEYS

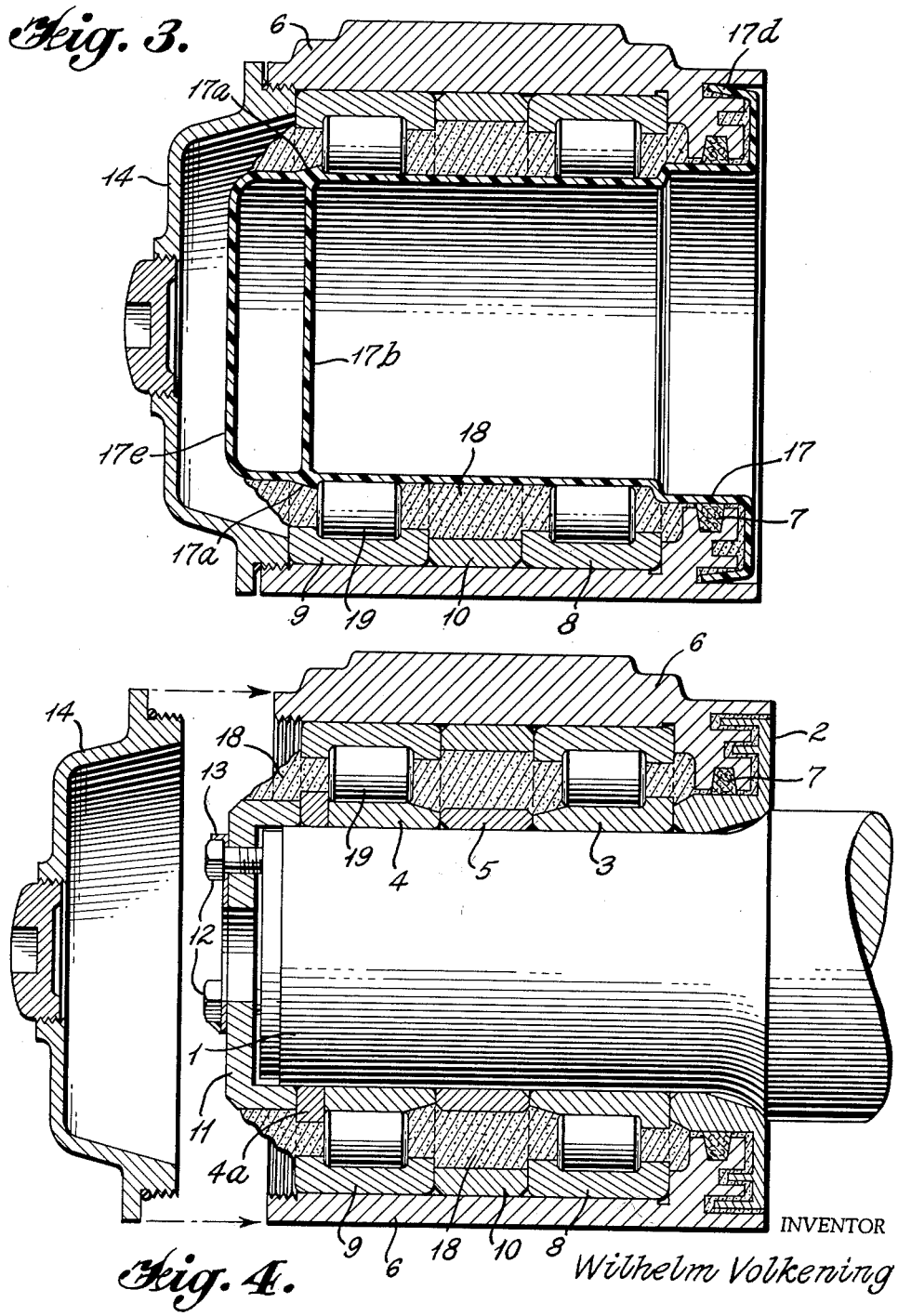

3,168,774
ARRANGEMENT FOR AND METHOD OF FACILITATING THE HANDLING AND FITTING OF ANTIFRICTION BEARINGS CAPABLE OF BEING DISMANTLED
Wilhelm Völkening, Dittelbrunn, Germany, assignor to Kugelfischer Georg Schafer & Co., Schweinfurt, Germany
Filed Nov. 29, 1961, Ser. No. 155,547
Claims priority, application Germany, Dec. 1, 1960, K 42,296
14 Claims. (Cl. 29—148.4)

Antifriction bearings capable of being dismantled, particularly axle bearings of the roller type, have been known to include parts cooperating with the axle, i.e. the inner race, the spacer sleeves and the locating rings, and further to include parts cooperating with the housing, i.e. the housing itself, the outer race, spacer sleeves and, where desired, a terminal ring and a sealing ring. Any of the parts mentioned may be present either singly or in a plurality and may each be made in a single piece or may be of the split type. Thus far it has been customary to supply the said parts as independent component parts to the user for assembly. In the assembly shop of the user or customer, the axle is first fitted with the labyrinth type sealing rings and then with the inner races of the antifriction bearings. Following this step, the outer arrays of parts of the antifriction bearings are introduced into the housings and then slid over the inner races which are already in position on the axle. Before the assembly including the housing and the outer race systems of the bearings is slid into position, the lubricating grease for the axle bearing is introduced into the spaces within the bearing which are accessible for this purpose. The final steps include the attachment of the axle terminal cap and the bolting in position of the bearing cover. During these operations, the delicate component parts of the antifriction bearing assembly are exposed to the unfavorable conditions prevailing in the large shops where sets of wheels are assembled. The bearings are liable to become contaminated with dirt, or they are damaged by shocks and falls, and the lubricant may be contaminated with foreign matter.

The present invention eliminates these drawbacks by providing an arrangement designed to facilitate the handling and installation of dismountable antifriction bearing assemblies; according to the invention, those bearing elements which cooperate with the axle on the one hand, and those bearing elements which cooperate with the bearing housing on the other are each mounted on an associated sleeve whereon they are maintained as unitary assemblies. According to another feature of the invention, the said sleeve may be formed of a suitable elastic material, preferably a plastic material or of pressboard material. According to the invention it is of advantage to provide the sleeve intended to accommodate the bearing elements cooperating with the axle with beads which are adapted, by their spring action, to lock the inner bearing races in position. The other sleeve which is intended to be introduced into the bearing elements cooperating with the bearing housing may be provided with radially outwardly extending projections adapted yieldably to hold the sleeve against axial displacement, and may further be provided with a formation permitting the sleeve to be withdrawn from the bearing elements placed thereon. According to still another aspect of the invention, the lubricating grease may be introduced into the hollow spaces between the bearing elements cooperating with the housing and the sleeve introduced thereinto, the grease being retained in the said spaces by sealing lips provided on the sleeve and abutting adjacent portions of the bearing housing.

The present invention also relates to a method of installing dismountable antifriction bearings, particularly axle bearing arrangements of the roller bearing type, whereby the bearing elements cooperating with the axle on the one hand and the bearing elements cooperating with the housing on the other are combined to form sub-assemblies together with the respective sleeve, the sub-assemblies thus formed being delivered to the user's workshop where the sleeves are removed and the bearing parts are combined with the axle, the two sub-assemblies then constituting a finished bearing assembly. During the assembly step, the bearing elements cooperating with the axle and carried temporarily by the said sleeve may be heated inductively in a known manner before the elements are mounted on the axle.

Thus, according to the invention, the customer is supplied with two sub-assemblies only, i.e. the bearing elements cooperating with the axle which are held together by a sleeve, and the bearing elements cooperating with the housing which are also held together by a sleeve. This arrangement affords a considerable facilitation of the assembly operations to be carried out in the workshop where the sets of wheels and axles are assembled. Furthermore, the seating surfaces of the bearing elements cooperating with the axle are protected from damage in transit, and it is possible, in the manufacturer's factory, to introduce the proper amount of the most suitable lubricant into the bearing elements cooperating with the housing, the lubricant being fully protected against the ingress of foreign matter up to the time when they are mounted on an axle.

Other objects and features of the invention will become apparent as the description proceeds, especially when taken in conjunction with the accompanying drawing, illustrating a preferred embodiment of the invention, wherein:

FIG. 1a is a fragmentary longitudinal cross-section of the auxiliary device of the invention for transporting and fitting the annular bearing elements and shows the device before having been fitted into the annular bearing members;

FIG. 3 is a longitudinal cross-sectional view of a particularly useful modification of the auxiliary device of the invention; and FIG. 4 illustrates the last step of the assembly operations.

Figure 1:
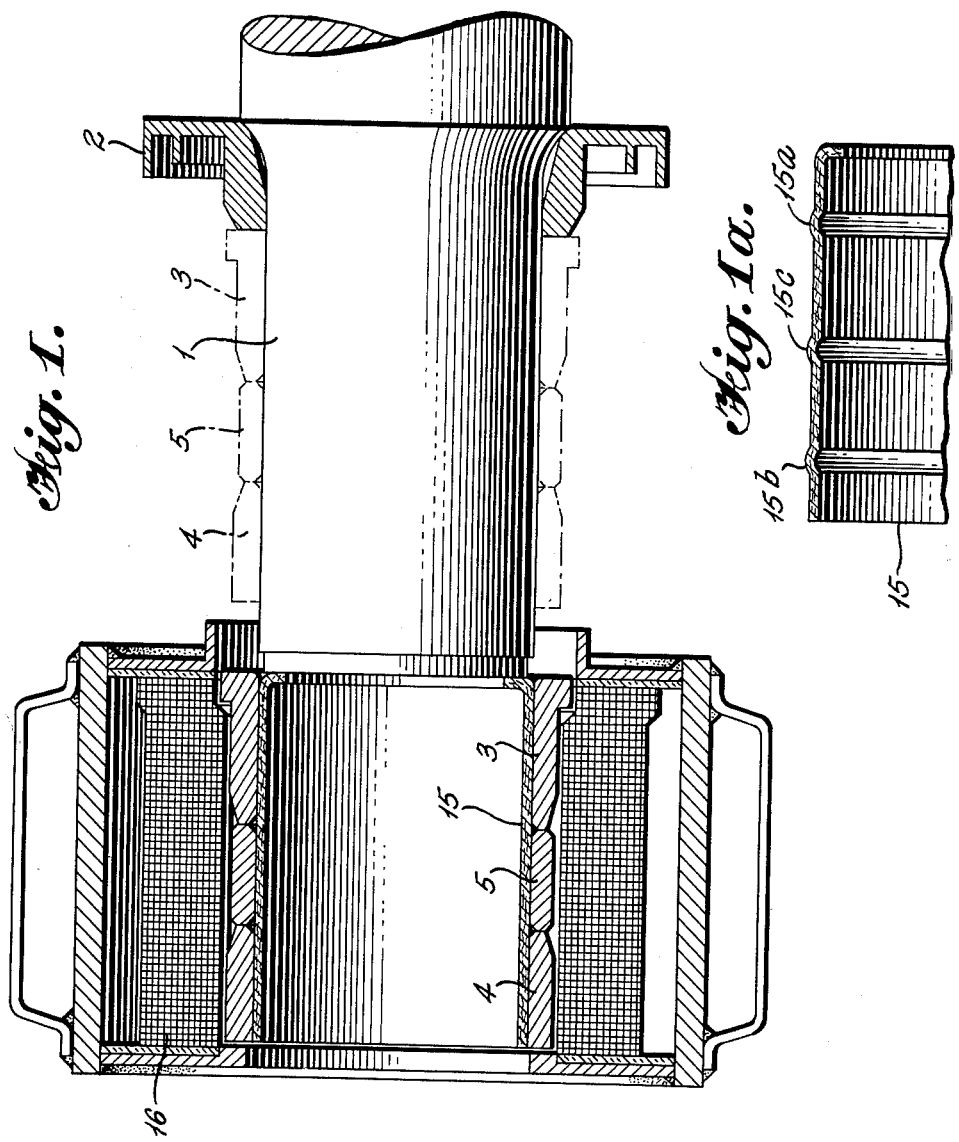
FIG. 1 illustrates the step of fitting bearing elements cooperating with the axle in a part-sectional elevation.

As shown in FIG. 1, the inner races 3 and 4 of a dismountable bearing assembly, if desired also the spacer ring 5, are delivered to the user in position on an auxiliary sleeve 15. After the labyrinth type sealing ring 2 has been slid over the axle journal 1, the bearing elements 3, 4 and 5 carried by the sleeve 15 are placed in front of the axle journal. Using a per se known inductive heating device 16 the inner races are heated and, upon having reached the proper assembly temperature, are pushed onto the axle journal 1. The sleeve 15 is formed in such a manner that it abuts the end face of the axle journal 1 and that it guides the annular members 3, 4 and 5 in such a manner that the members are held in a coaxial position in relation to the axle journal 1. The auxiliary sleeve 15 is made of an elastic material such as pressboard. Peripheral beads 15a, 15b and 15c are provided as shown in FIG. 1a, said beads being respectively located midway between the ends of the associated annular members 3, 4 and 5 so as to lock the latter in position upon insertion of the sleeve thereinto. In the assembled condition, the outer diameter of sleeve 15 is in full bearing contact with the bores of the annular members 3 to 5.

Figure 2:
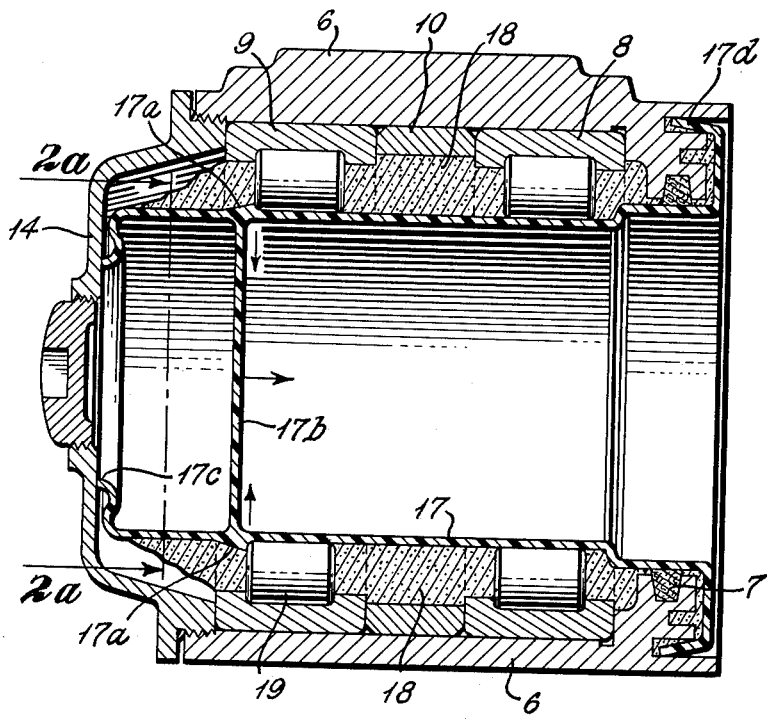
FIG. 2 shows in a longitudinal cross-section the sub-assembly, ready for transportation, comprising the bearing elements cooperating with the bearing housing and the associated sleeve member.
Figure 2A:
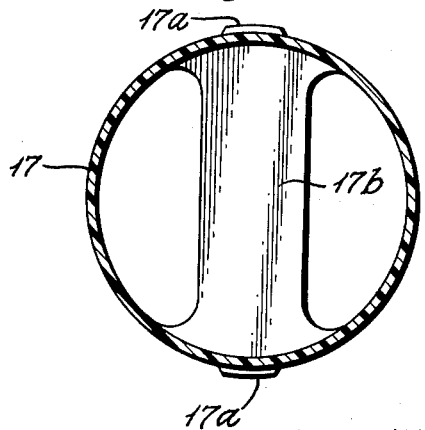
FIG. 2a is a transverse cross-section along the line A—A in FIG. 2 and shows the auxiliary device of the invention.

As shown in FIG. 2, the outer sub-assembly of the dismountable bearing is preparatorily fitted into the housing 6 so that the user can be supplied with a housing 6 in which the outer races 8 and 9 and, where desired, a spacer ring 10 have been fitted. In addition, a felt ring 7 is inserted into an annular groove provided therefor, and the lubricating grease 18 is introduced into the outer sub-assembly of the bearing. During transit and up to the time of installation, the sub-assembly formed by the axle bearing housing or box and the system of outer annular members is closed by means of a sleeve 17 formed of a suitable plastic material in such a manner as to incorporate two lugs 17a engaging the outer end faces of the outer row of bearing rollers 19 so as to prevent inadvertent withdrawal of the sleeve after insertion thereof into the inner space of the bearing. Formed below the lugs 17a of the plastic sleeve 17 is a web 17b permitting the sleeve 17 to be withdrawn from the bearing. The application of a pulling force in an axial direction to the said web will cause the lugs 17a to be displaced inwardly in the direction of the arrows in FIG. 2, thus permitting the plastic sleeve to be withdrawn from the bearing sub-assembly. In this condition, the housing 6 containing the system of outer annular members may be pushed over the axle journal 1 carrying the previously installed inner races 3 and 4. The sealing lips 17c and 17d provided on sleeve 17 enclose in a reliable manner the inner space of the bearing containing the grease supply 18. FIG. 3 shows a modification in which the sleeve 17 includes a closed bottom 17e.

After the sub-assembly formed by the housing and the system of outer annular members has been pushed into position, the cover 14 is screwed off; then the retaining ring 4a (FIG. 4) is inserted; finally the terminal member 11 is attached by means of the screws 12 which are locked in position by means of the tabs of a locking plate 13. Finally, the cover 14 is again screwed into the housing of the bearing.

It will be noted that the invention is not limited to the aforedescribed embodiment of a roller type axle bearing having two rows of cylindrical rollers, but that the invention may be modified for application in the case of other types of dismountable antifriction bearing arrangements.

What is claimed is:

1. A bearing arrangement for facilitating the handling and fitting of dismountable antifriction bearing assemblies having a plurality of annular bearing parts, comprising an elastic sleeve means the outer diameter of which corresponds substantially to the inner diameter of said bearing parts, said sleeve means yieldingly engaging the inner surface of said bearing parts to retain said bearing parts assembled in coaxial relation, and having elastical sections projecting radially beyond the surface thereof, said sections engaging and locking said bearing parts resiliently into a unit.

2. The bearing arrangement as set forth in claim 1, wherein said sections are formed as peripheral beads, said beads engaging the inner surfaces of inner race members of said dismountable antifriction bearings substantially in the middle of the width of the individual race means and being at least equal in number to the number of race members assembled into one unit.

3. The bearing arrangement as set forth in claim 1, wherein said sections are shaped as radially projecting lugs yieldingly engaging end faces of outer race members of said dismountable antifriction bearings being assembled into one unit, said sleeves being provided with a web, said web radially extending within said sleeve means and being connected at opposite places to the inner surface of said sleeve means.

4. The bearing arrangement as set forth in claim 1, wherein said sections are formed as radially projecting lugs yieldingly engaging end faces of outer race members of said dismountable antifriction bearings being assembled into one unit.

5. The combination of claim 4, comprising furthermore a housing, said housing surrounding said outer race members, said sleeve means being provided at their ends with additional peripheral lips, said lips being adapted to seal said race members enclosed by said sleeve means and said housing.

6. A bearing arrangement for facilitating the handling and fitting of dismountable antifriction bearing assemblies to be mounted on an axle comprising a first subassembly including a first sleeve member having disposed thereon inner bearing means to be placed on said axle, and a second subassembly including a second sleeve member having disposed thereon outer bearing means inserted in a housing, said sleeve members being made of elastic material, and said first sleeve member being provided with peripheral beads to resiliently lock said inner bearing means.

7. A bearing arrangement as set forth in claim 6, wherein lubricating grease is disposed in the hollow space between said outer bearing elements and said second sleeve member, said grease being maintained in said space by sealing lips attached to said sleeve and engaging said housing.

8. A bearing device as set forth in claim 6, wherein said second sleeve element comprises a closed bottom.

9. A bearing arrangement as set forth in claim 6, wherein said first and said second sleeve members are made of plastics.

10. A bearing arrangement as set forth in claim 6, wherein said first and said second sleeve members are made of pressed paper.

11. A bearing arrangement as set forth in claim 6, wherein said second sleeve member comprises radially projecting lug means to yieldingly hold said second sleeve against an axial displacement, and a web portion adapted to be grasped to remove said sleeve from said outer bearing means.

12. A bearing arrangement as set forth in claim 11, wherein said first and said second sleeve members are made of plastics.

13. A bearing arrangement as set forth in claim 11, wherein said first and said second sleeve members are made of pressed paper.

14. A method for mounting dismountable antifriction bearing assemblies, comprising the steps of providing a first sleeve means the outer diameter of which corresponds substantially to the inner diameter of inner race members of the bearing assembly, arranging said inner race members on said first sleeve means, providing a second sleeve means the outer diameter of which corresponds substantially to the outer diameter of said inner race members, arranging outer race members of the bearing assembly with roller means on their inner side on said second sleeve means, providing a housing means the inner diameter of which corresponds substantially to the outer diameter of said outer race members, surrounding said outer race members with said housing means and covering the front faces of said outer race members, in order to protect said outer race members and said roller means, arranging said inner race members with said first sleeve means coaxially with and adjacent to said axle, stripping said inner race members onto said axle, withdrawing said second sleeve means from said outer race members and disposing said outer race means with said roller means and said housing means on said inner race means.

References Cited by the Examiner

UNITED STATES PATENTS

| | | | |
|---|---|---|---|
| 881,471 | 3/08 | Hoffman | 29—148.4 |
| 1,947,004 | 2/34 | Goddard et al. | 29—148.4 |
| 1,982,932 | 12/34 | Scribner | 29—201 XR |
| 2,034,534 | 3/36 | Pitner | 29—201 XR |
| 2,312,615 | 3/43 | Allen | 206—46 |
| 2,802,705 | 8/57 | Halvorsen et al. | 308—180 |

FOREIGN PATENTS 569,368   2/33   Germany.

WHITMORE A. WILTZ, *Primary Examiner.*

RICHARD DOUGLAS, *Examiner.*